United States Patent
Kanzaki

(10) Patent No.: US 9,083,267 B2
(45) Date of Patent: Jul. 14, 2015

(54) ELECTRIC MOTOR VEHICLE

(71) Applicant: Takao Kanzaki, Miyoshi (JP)

(72) Inventor: Takao Kanzaki, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 51 days.

(21) Appl. No.: 13/926,480

(22) Filed: Jun. 25, 2013

(65) Prior Publication Data

US 2014/0001988 A1  Jan. 2, 2014

(30) Foreign Application Priority Data

Jun. 27, 2012  (JP) ................................. 2012-144198

(51) Int. Cl.
| | |
|---|---|
| *H02P 27/00* | (2006.01) |
| *B60W 20/00* | (2006.01) |
| *H02P 6/00* | (2006.01) |
| *B60L 3/00* | (2006.01) |
| *H02P 29/02* | (2006.01) |

(52) U.S. Cl.
CPC ............... *H02P 6/001* (2013.01); *B60L 3/0046* (2013.01); *B60L 3/0092* (2013.01); *H02P 29/025* (2013.01); *B60L 2210/14* (2013.01); *Y02T 10/642* (2013.01); *Y02T 10/7225* (2013.01)

(58) Field of Classification Search
None
See application file for complete search history.

(56) References Cited

U.S. PATENT DOCUMENTS

| | | | | |
|---|---|---|---|---|
| 4,327,314 | A | * | 4/1982 | Hosokawa et al. ............ 318/722 |
| 4,481,455 | A | * | 11/1984 | Sugimoto et al. ............. 318/778 |
| 7,728,537 | B2 | * | 6/2010 | Tomigashi ............... 318/400.02 |
| 8,669,673 | B2 | * | 3/2014 | Yamashita ...................... 307/9.1 |
| 2006/0274559 | A1 | * | 12/2006 | Saeueng et al. ............ 363/21.06 |
| 2009/0174353 | A1 | * | 7/2009 | Nakamura et al. ....... 318/400.27 |
| 2010/0030412 | A1 | * | 2/2010 | Mitsutani ........................ 701/22 |
| 2013/0187576 | A1 | | 7/2013 | Oikawa et al. |

FOREIGN PATENT DOCUMENTS

| | | |
|---|---|---|
| JP | A-2007-306720 | 11/2007 |
| JP | A-2008-182841 | 8/2008 |
| JP | A-2008-182842 | 8/2008 |
| JP | A-2009-196545 | 9/2009 |
| JP | A-2010-068689 | 3/2010 |
| WO | WO 2012/046271 A1 | 4/2012 |

* cited by examiner

*Primary Examiner* — Eduardo Colon Santana
*Assistant Examiner* — Cortez Cook
(74) *Attorney, Agent, or Firm* — Oliff PLC

(57) ABSTRACT

An electric motor vehicle includes an inverter, an electric motor, a power supply circuit, and a controller. The power supply circuit converts alternating current that the electric motor serving as a generator generates into direct current. The controller is supplied with electric power from the power supply circuit and controls switching elements of an inverter. The power supply circuit includes a transformer and a voltage regulator. The transformer includes a primary coil and a secondary coil, and the primary coil is connected to the electric motor. The voltage regulator adjusts the output of the secondary coil of the transformer to a predetermined direct-current voltage.

6 Claims, 2 Drawing Sheets

ELECTRIC MOTOR VEHICLE

INCORPORATION BY REFERENCE

The disclosure of Japanese Patent Application No. 2012-144198 filed on Jun. 27, 2012 including the specification, drawings and abstract is incorporated herein by reference in its entirety.

BACKGROUND OF THE INVENTION

1. Field of the Invention

The invention relates to an electric motor vehicle. The "electric motor vehicle" in this specification includes a hybrid vehicle equipped with both an electric motor and a combustion engine, and a fuel cell vehicle.

2. Description of Related Art

An electric motor vehicle is equipped with an inverter that converts direct-current power of a battery into alternating-current power of a frequency that is suitable to drive an electric motor. Many an electric motor vehicle is designed so that at the time of braking, inertia energy of the vehicle is utilized to cause an electric motor to generate electric power, and the generated electric power is then converted by an inverter into direct-current power, with which the battery is charged.

For example, in the case where a three-phase alternating-current electric motor is employed, the inverter outputs alternating electric currents of three different phases. In order to produce three-phase alternating current from direct-current power, the inverter has, as a main circuit, a construction that includes three parallel connected circuit sets in each of which two switching elements are interconnected in series. An output line of the electric motor extends from an intermediate point of the series connection between the two switching elements of each circuit set. The two series-connected switching elements are referred to as "arm". Furthermore, of the two series-connected switching elements of each circuit set, the current path that extends through the higher-voltage switching element is often referred to as "upper arm", and the current path that extends through the lower-voltage switching element is often referred to as "lower arm".

In some types of vehicles, the inverter and the electric motor are always electrically connected together. In an electric motor vehicle of such a type, if one of the switching elements has short-circuit failure and, at the same time, the electric motor is generating electricity, excessively large current may flow through the short-circuited switching element or a different specific site, so that the circuit may be damaged. Alternatively, excessively large current may reversely flow into the electric motor, so that a motor cable may be damaged or the permanent magnets of the electric motor may lose magnetism.

Examples of technologies for avoiding such damage are disclosed in Japanese Patent Application Publication No. 2007-306720 (JP 2007-306720 A), Japanese Patent Application Publication No. 2008-182842 (JP 2008-182842 A), and Japanese Patent Application Publication No. 2010-068689 (JP 2010-068689 A). In the technologies of JP 2007-306720 A and JP 2008-182842 A, if a switching element of the inverter has short-circuit failure, the inverter and the electric motor are disconnected to each other. In the technology of JP 2010-068689 A, if the switching element of an upper arm in the inverter has short-circuit failure, a controller causes the switching elements of the other upper arms to be short-circuited. Also, if the switching element of a lower arm in the inverter has short-circuit failure, the controller causes the switching elements of the other lower arms to be short-circuited. For this operation the current generated by the electric motor is dispersed.

To employ the technology of JP 2010-068689 A, electric power for controlling the switching elements is required. Usually, the controller of the inverters receives electric power for control from a battery. Therefore, as long as the electric power is supplied from the battery to the controller, the technology works satisfactorily. However, the electric power is not supplied to the controller, for example when the battery fails, or when a cable between the battery and the inverter is broken. Furthermore, if a vehicle is towed for a long time, the battery may become low in voltage and unable to supply sufficient electric power to the controller. A specific electric motor vehicle may have a high-voltage main battery that supplies electric power to the electric motor and an accessory battery. The accessory battery supplies electric power to low-voltage devices termed accessories, such as the control circuit of the inverter, a room lamp, etc. The electric power is supplied to the accessory battery from the main battery with reducing the voltage. In such a type of electric motor vehicle, when the main switch of the vehicle is off, the system main relay is also off; therefore, a voltage step-down converter for reducing the voltage supplied from the main battery to the controller can be stopped. Hence, during tow of the vehicle when the main switch of the vehicle is off, the accessory battery is the only battery that supplies electric power to the controller. If the vehicle is towed for a long time, the accessory battery may become low in electric power so that the inverter cannot be operated by the controller.

SUMMARY OF THE INVENTION

If any one of the switching elements of an inverter has short-circuit failure, it is necessary to control the switching elements so that the current generated by the electric motor will not concentrate to the short-circuited switching element or to a different specific site. If a controller for controlling the switching elements becomes unable to be supplied with electric power from a battery, it becomes impossible to control the switching elements so as to prevent concentration of the current generated by the electric motor. This specification provides a technology for securing an electric power for controller to control the switching elements supplied other than the battery, for the case where the controller cannot receive the electric power from the battery.

An embodiment of the electric motor vehicle disclosed by this specification relates to an electric motor vehicle that run using an electric motor which is driven by output of an inverter. The electric motor not only produces torque for moving the vehicle, but also functions as an electricity generator. The electric motor vehicle includes: a power supply circuit configured to convert alternating current that the electric motor serving as a generator generates into direct current; and a controller configured to be supplied with electric power from the power supply circuit and control a switching element of the inverter. The power supply circuit includes a transformer and a voltage regulator. The transformer includes a primary coil and a secondary coil, and the primary coil is connected to the electric motor. The voltage regulator adjusts the output of the secondary coil to a predetermined (constant) direct-current voltage.

An electric motor vehicle disclosed by the specification includes a main battery that stores electric power for driving the electric motor and an accessory battery that stores electric power for driving accessories, and further includes the power supply circuit that receives the alternating current generated by the electric motor and outputs direct-current power. Even when the controller cannot be supplied with electric power from either the main battery or the accessory battery, the controller is able to be supplied with electric power from the power supply circuit and control the switching elements if the electric motor is rotating.

The aforementioned power supply circuit is a circuit for supplying electric power to the controller when the controller cannot be supplied with electric power from the main battery or the accessory battery but the electric motor is rotating, that is, at the time of emergency. Incidentally, the primary coil of the transformer, which is an input terminal of the power supply circuit, may be connected in series between the electric motor and an output terminal of the inverter. In particular, at the time of such emergency, the controller may control the switching element of the inverter so that the current generated by the electric motor does not excessively flow to a predetermined site in the inverter.

The controller may control the switching element that does not have short-circuit failure in such a control manner that the current generated by the electric motor does not excessively flow to the switching element that has short-circuit failure.

When the switching element of an upper arm has short-circuit failure, the controller may turn on the switching element of another upper arm, and when the switching element of a lower arm has short-circuit failure, the controller may turn on the switching element of another lower arm. Furthermore, as a different example, the controller may also be configured to turn on all the three-phase switching elements of the lower arms when the switching element of an upper arm has short-circuit failure, and to turn on all the three-phase switching elements of the upper arms when the switching element of a lower arm has short-circuit failure.

An example of the aforementioned time of emergency is the case where at least one of the switching elements has short-circuit failure and where the N range (neutral range) has been selected at a shift selector of the electric motor vehicle and where the electric motor is rotating. In this case, the controller may be supplied with electric power from the power supply circuit and may control the switching elements.

Another example of the aforementioned time of emergency is the case where at least one of the switching elements has short-circuit failure and where the electric motor vehicle is towed. In this case, the controller may be supplied with electric power from the power supply circuit and may control the switching elements.

Details of the technologies and further improvements thereof disclosed by this specification will be described below in "DETAILED DESCRIPTION OF EMBODIMENTS".

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
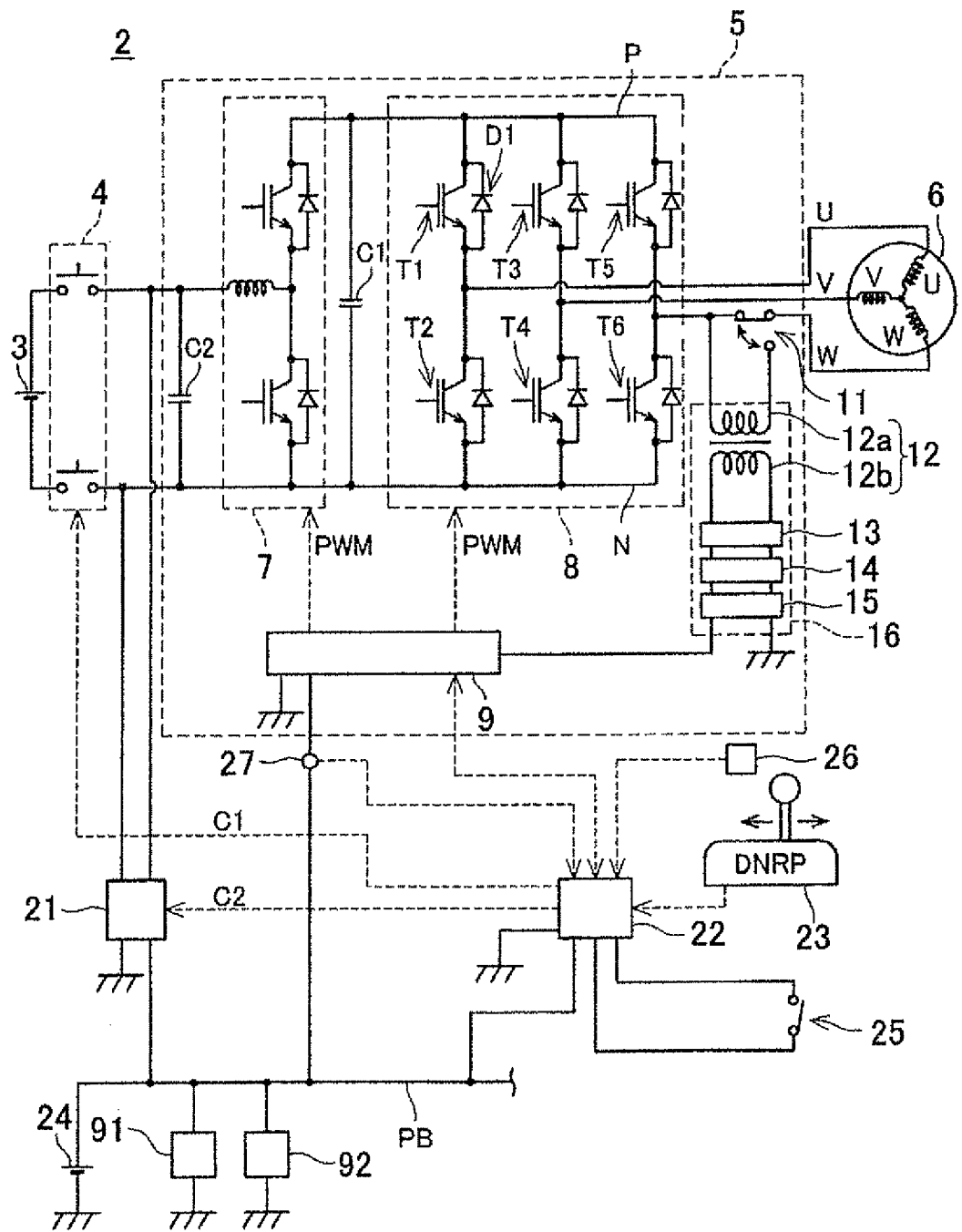
FIG. 1 is a block diagram of an electric power system of an electric motor vehicle in accordance with an embodiment of the invention.

An electric motor vehicle 2 in accordance with an embodiment of the invention will be described with reference to the accompanying drawings. FIG. 1 shows a block diagram of an electric power system of the electric motor vehicle 2. The electric motor vehicle 2 has a traction electric motor 6 for moving the vehicle. The electric motor 6 functions as a generator to generate electricity during braking. The electric motor vehicle 2 has a main battery 3 that stores electric power for driving the electric motor 6, and an accessory battery 24. The output of the main battery 3 is 100 volts or higher. The accessory battery 24 outputs a lower voltage (usually equal to or less than 50 volts) than the main battery 3, and supplies electric power to accessories. The "accessories" herein are devices that operate at voltages lower than the drive voltage of the electric motor, and include, for example, a room lamp 91, a navigation device 92, a controller (inverter controller 9) that controls switching elements of an inverter 5, a main controller 22 that governs and controls the entire vehicle, etc. Incidentally, the negative terminal of the accessory battery 24 is connected to a body of the vehicle as a ground. Therefore, the accessories, such as the room lamp 91, the inverter controller 9, etc., also have their negative terminals connected to the ground. In FIG. 1, a line PB extending from the positive terminal of the accessory battery 24 represents an electric power supply line for supplying electric power to the various accessories. There exist many accessories other than the accessories shown in FIG. 1; however, those other accessories as well as a portion of the electric power supply line PB are not shown in the drawings.

The main battery 3 is connected to the inverter 5 via a system main relay 4. Furthermore, the main battery 3 is connected to a voltage step-down converter 21 via the system main relay 4, and an output terminal (positive output terminal) of the voltage step-down converter 21 is connected to the electric power supply line PB. A negative output terminal of the voltage step-down converter 21 is connected to the ground. The voltage step-down converter 21 reduces the output voltage of the main battery 3 to a voltage suitable to charge the accessory battery 24. That is, the accessory battery 24 is charged with electric power from the main battery 3. Incidentally, the main battery 3 can be charged with electric power generated by the electric motor 6, or can also be charged with an external electric power supply (e.g., a commercial power supply).

The inverter 5 includes a voltage step-up/step-down circuit 7 and an inverter circuit 8. The voltage step-up/step-down circuit 7 has a function of boosting the voltage supplied from the main battery 3 and supplies the boosted voltage to the inverter circuit 8, and a function of reducing the voltage provided by the inverter circuit 8 converting the electric power generated by the electric motor 6 into direct current to a voltage suitable to charge the main battery 3. A lower-voltage side (battery side) of the voltage step-up/step-down circuit 7 is connected to a filter capacitor C2 for smoothing current. As shown in FIG. 1, the voltage step-up/step-down circuit 7 has a structure in which a reactor is connected to an intermediate point of a series connection between two switching elements (IGBTs (insulated gate bipolar transistors)). Each switching element is connected in antiparallel with a reflux diode that permits reverse flow of current. The circuit construction of the voltage step-up/step-down circuit 7 shown in FIG. 1 is well known, and detailed description thereof is omitted herein.

The high-voltage side terminal of the voltage step-up/step-down circuit 7 is connected to the inverter circuit 8 via a smoothing capacitor C1. The smoothing capacitor C1 is provided to smooth the current input to the inverter circuit 8.

The inverter circuit 8, as well known, has a construction in which three sets of two series-connected switching elements are connected in parallel. The two series-connected switching elements of a set are, for example, switching elements T1 and T2. That is, the inverter circuit 8 includes six switching elements T1 to T6. The switching elements are typically IGBTs. Each switching element is connected in antiparallel with a reflux diode that permits reverse flow of current. For example, a reflux diode D1 is connected in antiparallel with the switching element T1. Alternating electric current is output from an intermediate point of the series connection between each two switching elements. That is, from the three intermediate points, alternating current of three phases is output. The three-phase alternating-current output is used as electric power for driving the electric motor 6.

The two series-connected switching elements are generally referred to as "arms". More specifically, of each two switching elements, the switching element (T1, T3 or T5) connected to the high-voltage side (the side closer to the positive terminal line P in FIG. 1) is referred to as "upper arm", and the switching element (T2, T4 or T6) connected to the low-voltage side (the side closer to a negative terminal line N in FIG. 1) is referred to as "lower arm".

The inverter circuit 8 performs the function of converting the electric power from the main battery boosted by the voltage step-up/step-down circuit 7 into alternating current suitable to drive the electric motor 6, and the function of converting the alternating-current power generated by the electric motor 6 into direct current.

The inverter controller 9 gives control signals (PWM signals) that turn on and off the switching elements of the voltage step-up/step-down circuit 7 and of the inverter circuit 8. According to the PWM signals given by the inverter controller 9, the voltage step-up/step-down circuit 7 performs a voltage-boosting operation or a voltage-reducing operation, and the inverter circuit 8 performs DC-to-AC conversion or AC-to-DC conversion. The inverter controller 9 generates appropriate PWM signals on the basis of data on, for example, the vehicle speed, the amount of accelerator operation, the amount of depression of a brake pedal, the state of charge of the main battery 3, etc. Incidentally, as stated above, the inverter controller 9 usually operates on electric power supplied from the accessory battery 24 or from the main battery 3 via the voltage step-down converter 21.

The inverter 5 is equipped with a power supply circuit 16 for an accidental situation where electric power cannot be supplied from either the accessory battery 24 or the main battery 3. The power supply circuit 16 receives, by a transformer 12, the alternating-current power generated by the electric motor 6, and converts it into direct-current power by a rectifying and smoothing circuit 13, and outputs a stable constant voltage from a voltage regulator 15. The power supply circuit 16 has been set so that the output thereof has a voltage suitable to drive the inverter controller 9. An end of the primary coil 12a of the transformer 12 is connected to one of the output terminals of the inverter circuit 8 (the W-phase output terminal in FIG. 1), and the other end of the primary coil 12a is connected to the W phase of the electric motor via a switch 11. Incidentally, an example of a concrete construction of the power supply circuit 16 will be described later.

The switch 11 switches the connection of the W phase of the electric motor between the connection to the W-phase output terminal of the inverter circuit 8 and the connection to the primary coil 12a. Usually, that is, when the inverter does not have abnormality, the W phase of the electric motor is connected to the W-phase output terminal of the inverter circuit 8. The switch 11 switches the connection of the W phase of the electric motor from the connection to the W-phase output terminal of the inverter circuit 8 to the connection to the primary coil 12a. When the connection of the W phase of the electric motor is switched to the connection to the primary coil 12a, the primary coil 12a of the transformer 12 is connected in series between the electric motor and the output terminal of the inverter.

Usually, the power supply circuit 16 is disconnected from the inverter circuit 8 and the electric motor 6. When the switch 11 switches the connection of the W phase of the electric motor 6 from the W-phase output terminal of the inverter circuit 8 to the primary coil 12a while there is abnormality in the inverter and the electric motor 6 is being rotated to generate electricity by external force, the power supply circuit 16 activates to supply electric power to the inverter controller 9. The electric motor 6 rotates by external force, for example, when the vehicle is running by inertia or is being towed. That is, during this time, the inverter controller 9 can operate without receiving electric power from the accessory battery 24 or the main battery 3. The power supply circuit 16 is provided to supply electric power to the inverter controller 9 when the inverter controller 9 cannot be supplied with electric power from either the main battery 3 or the accessory battery 24. Although detailed later, particularly when the electric motor 6 is being rotated by external force and generating electricity and a switching element has short-circuit failure, the power supply circuit 16 supplies the inverter controller 9 with electric power. Then the inverter controller 9 controls the remaining normal switching elements that do not have short-circuit failure, without relying on electric power of a battery.

The abnormality of the inverter as described above, is that at least one of the switching elements has short-circuit failure. The influence of the short-circuit failure of a switching element will be described. When the electric motor 6 is being driven by external force and is generating electricity, the generated current flows into the inverter circuit 8. If at this time, any one of the switching elements of the inverter circuit 8 has short-circuit failure, current flows concentratedly to the short-circuited switching element so that overcurrent may flow to a specific site in the circuit of the inverter 5. Furthermore, the current having flown into the short-circuited switching element returns to the electric motor 6 through the reflux diode that is connected in antiparallel with another switching element. At this time, there is possibility of overcurrent flowing through the electric motor 6, and if that happens, a motor cable may be damaged or the permanent magnets of the motor 6 may lose magnetism. Thus, it is desirable to control the switching elements that do not have short-circuit failure so as to prevent current from concentrating to a specific site. The control to be performed when a switching element has short-circuit failure will be described later.

Other devices provided in the electric motor vehicle 2 will be described. The main controller 22 is a controller that governs and controls the entire electric system of the electric motor vehicle 2. Signals from a main switch 25 and a shift selector 23 are input to the main controller 22. The main switch 25 is a so-called ignition switch, and corresponds to a main switch of a vehicle system. When the main switch 25 is turned on, the main controller 22 closes the system main relay 4 to connect the main battery 3 to an electric circuit of the vehicle. In FIG. 1, C1 denotes a control signal line. Incidentally, the main controller 22 is supplied with electric power from the accessory battery 24.

The shift selector 23 is a device to be used to select one of the "DRIVE", "NEUTRAL", "REVERSE" and "PARKING" positions regarding the state of driving of the vehicle. The state of drive selected is notified to the main controller 22.

The vehicle speed sensor 26 detects the speed of the vehicle. In the electric motor vehicle 2, the driving wheels and the electric motor 6 are always interconnected, so that the data from the vehicle speed sensor 26 also represents the rotation speed of the electric motor 6. Furthermore, the voltage sensor 27 measures the voltage of the electric power supplied from the electric power supply line PB of the accessory battery 24 to the inverter controller 9. Sensor data from the vehicle speed sensor 26 and the voltage sensor 27 are also sent to the main controller 22.

Furthermore, the inverter controller 9 and the main controller 22 communicate with each other, and send data to and receive data from each other.

A process performed at the time of short-circuit failure of a switching element provided in the inverter circuit 8 will be described. The inverter controller 9 determines a target output of the electric motor 6 on the basis of information about the vehicle speed and the amount of accelerator operation, and controls the switching elements of the voltage step-up/step-down circuit 7 and the inverter circuit 8 so that the target output of the electric motor 6 is achieved. Furthermore, during braking of the vehicle, the inverter controller 9 controls the switching elements of the voltage step-up/step-down circuit 7 and the inverter circuit 8. They are controlled so as to convert the alternating-current power generated by the electric motor 6 working as a generator into direct-current power, and reduce the voltage of the direct-current power and charge the main battery 3 with the reduced-voltage electric power. Usually, as in the above-described process, the inverter controller 9 monitors the operations of the switching elements, and checks whether any one of the switching elements has short-circuit failure. As for a detection method for the short-circuit failure, a technology described in, for example, Japanese Patent Application Publication No. 2010-68689 (JP 2010-68689 A), Japanese Patent Application Publication No. 2008-182842 (JP 2008-182842 A) or Japanese Patent Application Publication No. 2007-306720 (JP 2007-306720 A), is employed. The inverter controller 9, upon detecting that a switching element has short-circuit failure, further determines whether the failed switching element is an upper-arm element or a lower-arm element. This determination can also be carried out by, for example, a technology described in JP 2010-68689 A mentioned above.

The inverter controller 9, upon detecting short-circuit failure of a switching element, stops operation of the inverter circuit 8, and notifies the stop of the inverter circuit 8 to the main controller 22. The main controller 22 turns on a warning light for notifying that the inverter circuit 8 has stopped due to failure. The warning light is provided, for example, in an instrument panel at the driver's seat. Simultaneously, the main controller 22 performs the following process if the vehicle speed based on the sensor data from the vehicle speed sensor 26 is not zero, that is, if the electric motor 6 is rotating. It is to be noted herein that "the electric motor 6 is rotating" means that the electric motor 6 is rotating by external force since, as described above, operation of the inverter for driving the electric motor 6 has stopped.

The controls that the main controller 22 and the inverter controller 9 carry out are as follows. That is, in the case where the short-circuited switching element is the switching element of an upper arm, the main controller 22 sends to the inverter controller 9 a command to turn on the switching elements of all the upper arms within the inverter circuit 8. On the basis of the command, the inverter controller 9 generates a drive command (PWM signal) to turn on all the upper-arm switching elements and turn off all the lower-arm switching elements, and sends the command to the switching elements. The short-circuited switching element remains on, regardless of the drive command. Conversely, in the case where the short-circuited switching element is the switching element of a lower arm, the main controller 22 sends to the inverter controller 9 a command to turn on all the lower-arm switching elements within the inverter circuit 8. On the basis of the command, the inverter controller 9 generates a drive command (PWM signal) to turn on all the lower-arm switching elements and turn off all the upper-arm upper switching elements, and sends the command to the switching elements. Incidentally, as another example, it is possible to perform a control of turning on all the three phase switching elements of the lower arms if an upper-arm switching element has short-circuit failure. Likewise, it is also possible to perform a control of turning on all the three phase switching elements of the upper arms if a lower-arm switching element has short-circuit failure.

By turning on all the switching elements of the same-side (upper or lower) arms as the arm of the short-circuited switching element as described above, it is possible to avoid concentration of current to a predetermined site in the inverter circuit or in the electric motor. Incidentally, this control of turning on all the switching elements of the same-side arms as the arm of the short-circuited switching element is detailed in Japanese Patent Application Publication No. 2010-68689, which should be referred to if necessary.

It suffices that during the foregoing process, the inverter controller 9 can be supplied with electric power from the accessory battery 24 or from the main battery 3 via the voltage step-down converter 21. However, this is sometimes impossible to maintain. Next, a case where there is possibility that the inverter controller 9 cannot be supplied with electric power from either the accessory battery 24 or the main battery 3 will be described.

When the vehicle is towed, the "Ready-OFF" mode is selected and the system main relay 4 is off, which means that the main battery 3 and the voltage step-down converter 21 are disconnected from each other. The voltage step-down converter 21 has stopped, and no electric power is supplied from the main battery 3 to the inverter controller 9. Although the accessory battery 24 is connected to the inverter controller 9, the use of the accessory battery 24 as the only electric power supply will eventually lead to a low state of charge (SOC), so that the inverter controller 9 can possibly stop because of insufficient electric power. In such a case, if the state of charge (or the amount of stored electric power) or the accessory battery 24 should become low, the inverter controller 9 can be operated by activating the power supply circuit 16 and causing electric power to be supplied from the power supply circuit 16 to the inverter controller 9. The state where the electric motor 6 continues rotating for a long time without operation of the voltage step-down converter 21 can occur typically when the electric motor vehicle 2 is towed for a long time with the shift selector 23 placed in the N range and with the driving wheels being in contact with the ground. Even in such a case, the electric motor vehicle 2 of the embodiment is able to avoid concentration of current generated by the electric motor 6 to a specific site. Concretely, the main controller 22 monitors the shift selector 23. When the shift selector 23 is placed in the N range (neutral range), with short-circuit failure of a switching element detected, and the electric motor 6 is rotating, the main controller 22 operates the switch 11 to connect the primary coil 12a of the transformer 12 to the electric motor 6. That is, the main controller 22 activates the power supply circuit 16 and causes electric power to be supplied from the power supply circuit 16 to the inverter controller 9.

Modifications of the above-described control will be described. In the foregoing embodiment, when at least one of the switching elements of the inverter circuit 8 has short-circuit failure and the neutral range has been selected at the shift selector 23 and the electric motor 6 is rotating, the main controller 22 connects the power supply circuit 16 to the electric motor 6. The power supply circuit 16 converts the alternating current that the electric motor 6 generates into direct current and supplies the direct current to the inverter controller 9. The main controller 22 may also have a construction described below, instead of the construction of the foregoing embodiment. That is, the main controller 22, instead of monitoring the shift selector 21, monitors the voltage of the electric power supplied from the electric power supply line PB of the accessories to the inverter controller 9. The voltage is measured by the voltage sensor 27. The main controller 22 activates the power supply circuit 16 when the voltage of the electric power supply line PB becomes lower than a predetermined threshold value. The predetermined threshold value herein is a minimum value of voltage that can operate the inverter controller 9 or a value close to that minimum value. The power supply circuit 16 is a back-up electric power supply that is used when electric power cannot be supplied from the electric power supply line PB of the accessories. Therefore, it is also preferable to activate the power supply circuit 16 when the voltage of the electric power supply line PB of the accessories becomes lower than the predetermined threshold value.

When at least one of the switching elements has short-circuit failure and the electric motor 6 continues rotating, it is also permissible to alternately turn on the normal switching elements provided in the same-side arms as the arm of the short-circuited switching element. This control can be made instead of turning-on all the switching elements of the same-side arms as the arm of the short-circuited switching element. This manner of control also avoids concentration of current generated by the electric motor 6. Alternatively, it is also permissible to restrain concentration of current by appropriately turning on and off the switching elements provided in the arms on one of the two sides that is different from the side of the arm of the short-circuited switching element.

Figure 2:
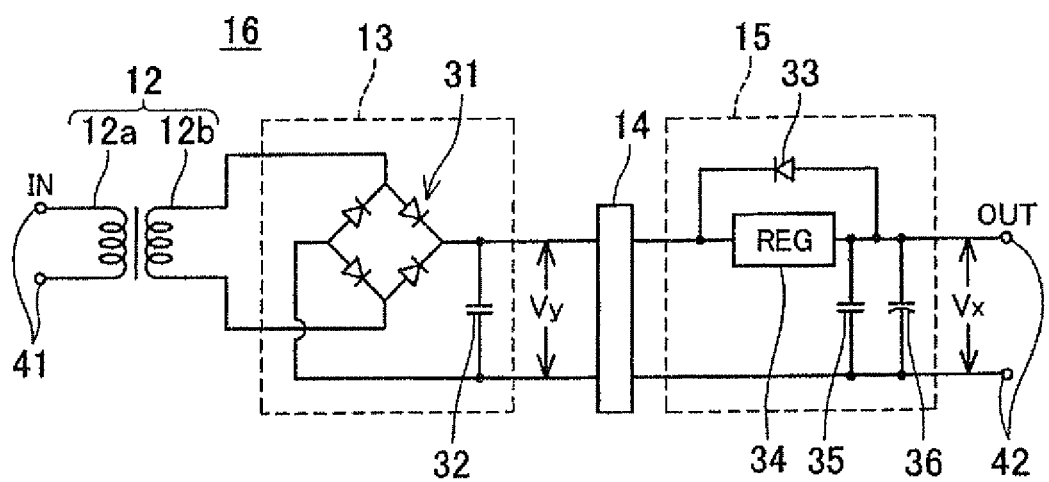
FIG. 2 is a block diagram showing an example of an electric power supply circuit.

Next, an example of the construction of the power supply circuit 16 will be described. FIG. 2 shows a block diagram of an example of the power supply circuit 16. The power supply circuit 16 is constructed of the transformer 12, the rectifying and smoothing circuit 13, a breaker circuit 14, and the voltage regulator 15 (series regulator) that are connected in series. As described above, one of input terminals 41 of the primary coil 12a of the transformer 12 is connected to the electric motor 6 via the switch 11, and the other input terminal is connected to an output terminal of the inverter circuit 8. The rectifying and smoothing circuit 13 is connected to a secondary coil 12b of the transformer 12. The rectifying and smoothing circuit 13, as shown in FIG. 2, includes a bridge rectifier circuit 31 made up of four diodes which rectifies the alternating current from the secondary coil 12b into direct current. A capacitor 32 is provided to smooth the current rectified by the bridge rectifier circuit 31. In the description below, the output voltage of the rectifying and smoothing circuit 13 is termed the input voltage Vy. The breaker circuit 14 is a circuit that protects the voltage regulator 15 (described later) when the input voltage Vy is excessively large. The breaker circuit 14 stops output when the input voltage Vy exceeds a predetermined value. The voltage regulator 15 is a series dropper-type regulator circuit that employs a three-terminal regulator 34. Incidentally, the capacitor 36 is inserted for the purpose of preventing oscillation. The bridge circuit and the regulator circuit shown in FIG. 2 are well known, and detailed descriptions thereof are omitted herein.

As is apparent from the circuit diagram shown in FIG. 2, the power supply circuit 16 is a circuit that passively adjusts voltage without a need to be supplied with electric power for control. That is, the power supply circuit 16 is caused to output a certain voltage by merely supplying alternating current to the input terminal 41. The power supply circuit 16 is capable of being caused to output direct-current power by merely connecting the primary coil 12a to the electric motor 6 in rotation without a need for supply of electric power from the accessory battery 24 or the main battery 3. Therefore, the power supply circuit 16 is suitable as a back-up electric power source to be used when the accessory battery 24 and the main battery 3 are both unusable. The power supply circuit 16 is capable of converting the alternating-current power that the electric motor 6 generates into direct-current power that is suitable to drive the inverter controller 9, without needing to be supplied with electric power from either the main battery 3 or the accessory battery 24.

Figure 3:
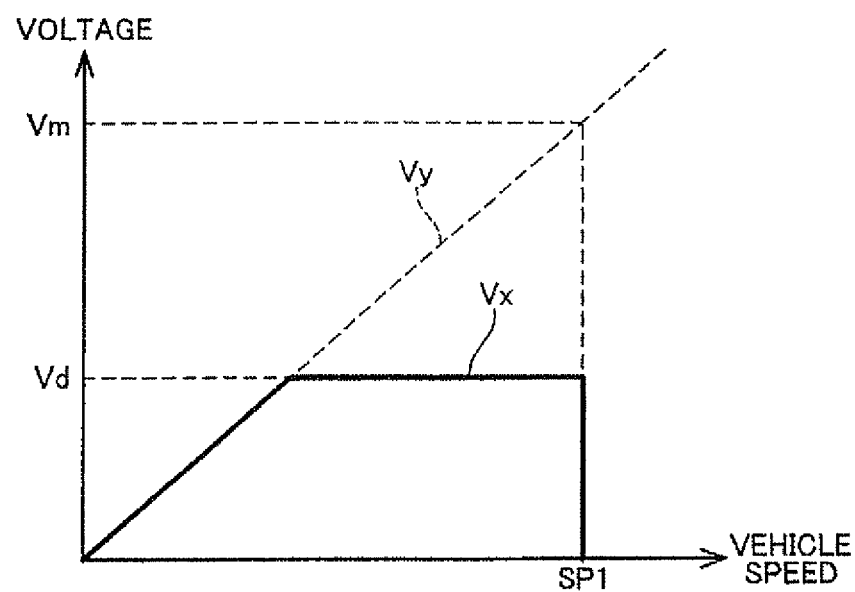
FIG. 3 is a graph showing relations between the output voltage of the power supply circuit and the vehicle speed.

The output voltage of the voltage regulator 15, that is, the output voltage of the power supply circuit 16, will be termed the output voltage Vx. The output voltage Vx is the voltage between output terminals 42. FIG. 3 shows a relation between the input voltage Vy and the vehicle speed and a relation between the output voltage Vx and the vehicle speed. As the vehicle speed increases, the rotation speed of the electric motor 6 increases. Therefore, the input voltage Vy increases with increase in the vehicle speed. The voltage regulator 15 maintains a constant output voltage (Vd in FIG. 3). It is to be noted herein that the output voltage Vx=Vd is set at a voltage suitable to drive the inverter controller 9. When the vehicle speed increases to the vehicle speed SP1, the input voltage Vy equals Vm. This value Vm of the input voltage corresponds to an upper-limit voltage of the voltage regulator 15. The breaker circuit 14 is configured to stop outputting when the input voltage Vy exceeds Vm. Therefore, if the vehicle speed is greater than or equal to SP1, the breaker circuit 14 activates, so that the output voltage Vx is zero. In this manner, the breaker circuit 14 protects the voltage regulator 15.

Points to note regarding the technologies described above in conjunction with the embodiment will be described below. In the foregoing embodiment, the switch 11 is switched by the main controller 22. Concretely, the main controller 22 switches the switch 11 so as to connect the electric motor 6 and the power supply circuit 16, when at least one of the switching elements of the inverter circuit 8 has short-circuit failure and the N range has been selected at the shift selector 23 and, furthermore, the electric motor 6 is rotating. Instead of this construction, it is also permissible to adopt a construction in which the switch 11 automatically connects the electric motor 6 to the power supply circuit 16 when the voltage of the electric power supply line PB of the accessory battery is lower than a predetermined value. An example of a construction that realizes such an operation. The switch 11 is a relay in which a normally closed terminal (a terminal that closes if electric power is not supplied) is connected to the primary coil 12a, and a normally open terminal (a terminal that opens if electric power is not supplied) is connected to an output terminal of the inverter circuit 8. The cable extending from the electric motor 6 is connected to a contact point that connects to one of the normally open terminal and the normally closed terminal. Then, electric power is supplied from the electric power supply line PB of the accessories to the relay. In that construction, when the voltage of the electric power supply line PB is greater than a predetermined value, the power supply circuit 16 is cut off from the electric motor 6, and when the voltage of the electric power supply line PB is below the predetermined value, the power supply circuit 16 is connected to the electric motor 6. The predetermined value is a minimum voltage that is needed in order to drive the accessories. This construction has an advantage in that the switch 11 is automatically switched in accordance with reduction in the state of charge of the accessory battery 24.

The inverter controller 9 in the embodiment performs both the function of controlling the inverter circuit 8 in order to drive the electric motor 6 during the ordinary running of the vehicle and the function of controlling, when a switching element has short-circuit failure, other switching elements. However, instead of this construction, it is also permissible to adopt a construction in which a controller that controls the inverter circuit 8 during the ordinary running of the vehicle and a controller that, at the time of a switching element having short-circuit failure, controls other switching elements are two separate controllers.

In the power supply circuit 16 in the embodiment, the primary coil 12a is connected in series between the electric motor 6 and an output terminal of the inverter circuit 8. This output terminal refers to an intermediate point between two series-connected, switching elements. Instead of this construction, it is also permissible to adopt a construction in which the primary coil 12a of the power supply circuit 16 is connected to the electric motor 6, separately from the inverter 5. For example, the primary coil 12a of the power supply circuit 16 may be connected to any two of the three phase terminals of the electric motor 6.

A combination of the main controller 22 and the inverter controller 9 in the embodiment corresponds to an example of a "controller" in the invention. The "controller" may be a physically one unit, or may also be a controller that is realized by cooperation of physically two or more units (separate casings).

While the concrete embodiment, examples and like of the invention have been described in detail above, these are merely illustrative, and are not intended to limit the scope of what is claimed in the appended claims. The technologies described in the appended claims include various modifications and changes of the concrete examples and the like illustrated above. The technical elements described or shown in this specification or the drawings achieve their technical usefulness individually or in various combinations thereof, and are not limited to the combinations described in the claims at the time of filing this application. Furthermore, the technologies illustrated in the specification or the drawings are able to simultaneously accomplish a plurality of objects, and have technical usefulness merely by accomplishing one of the objects.

What is claimed is:

1. An electric motor vehicle comprising:
    a battery;
    an inverter;
    an electric motor configured to be driven by output of the inverter, the electric motor being used to run the electric motor vehicle;
    a power supply circuit configured to convert alternating current that the electric motor serving as a generator generates into direct current, the power supply circuit including a transformer and a voltage regulator, the transformer including a primary coil and a secondary coil, the primary coil being connected to the electric motor, and the voltage regulator being configured to adjust output of the secondary coil to a predetermined direct-current voltage; and
    a controller configured to be alternatively supplied with electric power from the battery and the power supply circuit and to control switching elements of the inverter,
    wherein the controller is configured to be supplied with electric power from the power supply circuit and control the switching elements, when (i) at least one of the switching elements has short-circuit failure, (ii) a neutral range has been selected at a shift selector of the electric motor vehicle, and (iii) the electric motor is rotating.

2. The electric motor vehicle according to claim 1, wherein the primary coil is connected in series between the electric motor and an output terminal of the inverter.

3. The electric motor vehicle according to claim 1, wherein the controller is configured to control at least one of the switching elements so that the current generated by the electric motor does not excessively flow to a predetermined site in the inverter.

4. The electric motor vehicle according to claim 1, wherein the controller is configured to control at least one of the switching elements that does not have short-circuit failure in such a control manner that the current generated by the electric motor does not excessively flow to the switching element that has short-circuit failure.

5. The electric motor vehicle according to claim 1, wherein
    the inverter has a plurality of upper arms and a plurality of lower arms,
    when the switching element of one of the upper arms has short-circuit failure, the controller is configured to turn on the switching element of another upper arm, and
    when the switching element of one of the lower arms has short-circuit failure, the controller is configured to turn on the switching element of another lower arm.

6. The electric motor vehicle according to claim 1, wherein the controller is configured to be supplied with electric power from the power supply circuit and control the switching elements, when at least one of the switching elements has short-circuit failure and the electric motor vehicle is towed.

* * * * *